US007326665B2

United States Patent
Akada et al.

(10) Patent No.: US 7,326,665 B2
(45) Date of Patent: Feb. 5, 2008

(54) LIGHT BLUE FLAT GLASS

(75) Inventors: Shuichi Akada, Yokohama (JP); Masato Ooe, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 555 days.

(21) Appl. No.: 10/653,057

(22) Filed: Sep. 3, 2003

(65) Prior Publication Data

US 2004/0043886 A1    Mar. 4, 2004

(30) Foreign Application Priority Data

Sep. 4, 2002    (JP)    ............... 2002-258889

(51) Int. Cl.
*C03C 3/095*    (2006.01)
*C03C 3/087*    (2006.01)

(52) U.S. Cl. ............................. 501/64; 501/70; 501/71

(58) Field of Classification Search ............... 501/64, 501/70, 71
See application file for complete search history.

(56) References Cited

U.S. PATENT DOCUMENTS

| 5,030,594 | A | 7/1991 | Heithoff | |
| 6,218,323 | B1 | 4/2001 | Bretschneider et al. | |
| 6,610,622 | B1 * | 8/2003 | Landa et al. | 501/64 |
| 6,624,102 | B2 * | 9/2003 | Seto et al. | 501/71 |
| 6,962,887 | B2 * | 11/2005 | Heithoff | 501/64 |
| 7,030,047 | B2 * | 4/2006 | Landa et al. | 501/64 |
| 2002/0169064 | A1 | 11/2002 | Nagashima | |
| 2003/0100432 | A1 * | 5/2003 | Seto et al. | 501/71 |
| 2004/0110625 | A1 * | 6/2004 | Smith et al. | 501/72 |
| 2005/0170944 | A1 * | 8/2005 | Arbab et al. | 501/64 |

FOREIGN PATENT DOCUMENTS

| EP | 1 116 699 | 7/2001 |
| JP | 11-335132 | 12/1999 |
| JP | 2000-143283 | 5/2000 |
| JP | 2003-95691 | 4/2003 |

* cited by examiner

*Primary Examiner*—J. A. Lorengo
*Assistant Examiner*—Elizabeth A Bolden
(74) *Attorney, Agent, or Firm*—Oblon, Spivak, McClelland, Maier & Neustadt, P.C.

(57) ABSTRACT

A light blue flat glass which is soda-lime-silica glass and which contains Nd in such an amount that the content based on $Nd_2O_3$ represented by mass percentage, is from 0.001 to 0.1%, and no Co or Co in such an amount that the content based on CoO as represented by mass percentage, is less than 0.1 ppm.

4 Claims, No Drawings ed. Further, $\lambda_d$ is typically at least 485 nm. Here, $\lambda_d$ is
LIGHT BLUE FLAT GLASS

BACKGROUND OF THE INVENTION

1. Field of the Invention

The present invention relates to a light blue flat glass having a high visible light transmittance.

2. Discussion of Background

At lobby openings, etc. of hotels, museums, art galleries, office buildings, etc., a glass screen having a large area with a width of from 2 to 3 m and a height of at least 3 m is used in many cases for such reasons as to see outside scenery, to emphasize visual continuity to outside, to present an open atmosphere, etc.

In a suspension system for such a glass screen having a large area, glass stands (hereinafter referred to as glass ribs) are used. The glass ribs are disposed vertically to the glass screen, and thus, an end face of the glass rib is exposed inside of the room (or inside of the building) or outside of the room (or outside of the building).

Heretofore, for such a glass screen having a large area, a flat glass has been used which tends to have green color or a yellowish green color as the thickness increases, and the end face of the glass rib also used to exhibit such a color.

For the purpose of solving such a problem of coloration of the end face of a flat glass, a soda-lime-silica glass having CoO incorporated in an amount of from 0.1 to 1 ppm, has been proposed (JP-A-2000-143283).

If it is attempted to industrially produce a soda-lime-silica glass plate containing from 0.1 to 1 ppm of CoO in a large quantity, the following problem is likely to result. Namely, industrial production of a soda-lime-silica glass plate is usually carried out in a scale of a few hundreds tons/day, but it is not easy to uniformly mix and disperse a very small amount of a CoO material in the glass material so that the content will be at most 1 ppm.

Accordingly, in the industrial production, fluctuation of the CoO content in the glass tends to be substantial, whereby the above-mentioned problem of coloration may not sufficiently be solved.

SUMMARY OF THE INVENTION

It is an object of the present invention to provide a light blue flat glass which is capable of solving such a problem.

The present invention provides a light blue flat glass which is soda-lime-silica glass and which contains Nd in such an amount that the content based on $Nd_2O_3$ represented by mass percentage, is from 0.001 to 0.1%, and no Co or Co in such an amount that the content based on CoO as represented by mass percentage, is less than 0.1 ppm.

DETAILED DESCRIPTION OF THE PREFERRED EMBODIMENTS

The light blue flat glass of the present invention (hereinafter referred to as the flat glass of the present invention) is produced, for example, by preparing and mixing raw materials, charging the mixture into a glass melting furnace at a high temperature, melting it, forming the obtained molten glass into a plate by a well known float process, followed by cooling.

The thickness of the flat glass of the present invention is typically at least 5 mm. In a case where it is used for e.g. a glass rib, the typical thickness is from 12 to 19 mm. Further, in a case where it is produced by a float process, the thickness is, for example, at most 25 mm.

The dominant wavelength $\lambda_d$ of the flat glass of the present invention as calculated in a thickness of 12 mm, is preferably at most 510 nm. If it exceeds 510 nm, the glass tends to be green, or the yellowish tint tends to be intensified. Further, $\lambda_d$ is typically at least 485 nm. Here, $\lambda_d$ is measured by using standard light source C.

The visible light transmittance $T_v$ of the flat glass of the present invention as calculated in a thickness of 12 mm, is preferably at least 55%. If it is less than 55%, the visibility, for example, in a case where the thickness is at least 12 mm, is likely to deteriorate. More preferably, it is at least 80%. Here, $T_v$ is measured by using standard light source C.

The excitation purity $P_e$ of the flat glass of the present invention as calculated in a thickness of 12 mm, is preferably at most 8%. If it exceeds 8%, the color density of the glass may look too much. It is more preferably at most 5%. Further, $P_e$ is typically at least 0.1%. Here, $P_e$ is measured by using standard light source C.

The flat glass of the present invention preferably has $\lambda_d$ of at most 510 nm, $T_v$ of at least 55% and $P_e$ of at most 8%, as calculated in a thickness of 12 mm.

As an embodiment wherein $T_v$ is large, one having $\lambda_d$ of from 485 to 497 nm, $T_v$ of at least 80% and $P_e$ of at most 5% may be mentioned (Embodiment A).

As an embodiment wherein $T_v$ is larger, one having $\lambda_d$ of from 490 to 510 nm, $T_v$ of at least 85% and $P_e$ of at most 0.6% may be mentioned (Embodiment B).

Now, the composition of the flat glass of the present invention will be described as represented by mass percentage or mass ppm. Further, for example, the content based on $Nd_2O_3$ may be referred to as the $Nd_2O_3$ content or simply as $Nd_2O_3$, and "containing $Nd_2O_3$" may be used for the meaning of "containing Nd", and $Nd_2O_3$ may be used for the meaning of Nd.

$Nd_2O_3$ is a component to give the light blue color and is essential. If it is less than 0.001%, the light blue color can not be obtained. Preferably, it is at least 0.003%. If it exceeds 0.1%, the color tends to be too deep. Preferably, it is at most 0.08%.

No Co should be contained, or if Co is contained, the CoO content should be less than 0.1 ppm. Here, "less than 0.1 ppm" is meant for a content to such an extent as contained as an impurity in the raw material. If it is contained in an amount of 0.1 ppm or more, the color is likely to be too deep.

In the above Embodiment A or the like, it is preferred that Fe is contained in such an amount that the $Fe_2O_3$ content is more than 0.02% and at most 0.1%, and the $Nd_2O_3$ content is from 0.01 to 0.08%.

In the above Embodiment B or the like, it is preferred that no Fe is contained, or even if Fe is contained, the $Fe_2O_3$ content is at most 0.02%, and the $Nd_2O_3$ content is from 0.001 to 0.02%.

In a case where Fe is contained, the $Fe_2O_3$ content is preferably at most 0.4%. If it exceeds 0.4%, $T_v$ tends to be too small. More preferably, it is at most 0.3%, particularly preferably at most 0.15%.

Further, $Fe^{2+}/(Fe^{2+}+Fe^{3+})$ is typically at most 0.4, more typically at most 0.28.

The flat glass of the present invention is soda-lime-silica glass, which typically comprises from 65 to 75% of $SiO_2$, from 0 to 5% of $Al_2O_3$, from 10 to 16% of $Na_2O$, from 0 to 5% of $K_2O$, from 5 to 15% of CaO, from 0 to 7% of MgO and from 0 to 3% of $SO_3$. Here, for example, "contains from 0 to 5% of $Al_2O_3$" means that no $Al_2O_3$ is contained or if $Al_2O_3$ is contained, its content is at most 5%.

The flat glass of the present invention essentially comprises the above-mentioned components, but other components may be contained within a range not to impair the purpose of the present invention. Here, the total content of such other components is preferably at most 10%, more preferably at most 5%.

Now, such other components will be described.

SrO, BaO, ZnO, $ZrO_2$ or the like may be contained within a range of, for example, at most 1% each, for the purpose of adjusting the mechanical properties or thermal properties of the glass or as an impurity.

$Sb_2O_3$, F, Cl or the like may be contained within a range of, for example, at most 0.5% each as a refining agent or as an impurity.

$SnO_2$ may be contained within a range of, for example, at most 0.5% for the purpose of adjusting the reduction degree of glass or as an impurity.

With respect to the coloring components, it is preferred that no component other than the above-mentioned two types of $Nd_2O_3$ and $Fe_2O_3$, is contained. However, for example, with respect to the above Embodiments A and B, the upper limits of the contents allowable as impurities, are as follows. Those not bracketed are examples of the upper limits in the Embodiment A, and those in the brackets are examples of the upper limits in the Embodiment B.

$TiO_2$:0.2% (0.1%), $V_2O_5$:0.02% (0.001%), $Cr_2O_3$: 0.005% (0.001%), $MnO_2$:0.01% (0.001%), NiO:0.005% (0.001%), CuO:0.01% (0.001%), Se:0.0003% (0.0001%), $Er_2O_3$:0.01% (0.001%), and rare earth metal oxides other than two types of $Nd_2O_3$ and $Er_2O_3$:0.1% (0.1%).

Now, the present invention will be described in further detail with reference to Examples and Comparative Examples. However, it should be understood that the present invention is by no means restricted by such specific Examples.

EXAMPLES 1 to 11

Raw materials were prepared, mixed and melted to obtain a glass having the composition shown by mass percentage in lines for from $SiO_2$ to $TiO_2$ in each Table, followed by forming into a plate shape to obtain a flat glass. In each of Examples 1 to 5, melting was carried out in a platinum crucible, and the molten glass was cast on a carbon plate, followed by annealing to obtain a flat glass. In each of Examples 6 and 9 to 11, melting was carried out in a glass melting furnace, followed by forming by a float process and by cooling, to obtain a flat glass. Further, with respect to the glass of the composition in Example 7 or 8, no flat glass was prepared, but the after-mentioned optical characteristics were obtained by calculation.

Further, R in each Table represents $Fe^{2+}/(Fe^{2+}+Fe^{3+})$

Examples 1 to 8 are Working Examples of the present invention, and Examples 9 to 11 are Comparative Examples.

With respect to flat glasses of Examples 1 to 11, the optical characteristics were obtained. The results are shown in the Tables.

$T_v$ (unit: %) represents the above-mentioned visual light transmittance; x and y represent the chromaticity coordinates in the XYZ color system; $\lambda_d$ (unit: nm) represents the above-mentioned dominant wavelength; and $P_e$ (unit: %) represents the above-mentioned excitation purity, as calculated in a thickness of 12 mm.

TABLE 1

|  | Ex. 1 | Ex. 2 | Ex. 3 | Ex. 4 | Ex. 5 | Ex. 6 |
|---|---|---|---|---|---|---|
| $SiO_2$ | 71.6 | 71.6 | 71.8 | 71.9 | 71.9 | 71.8 |
| $Al_2O_3$ | 1.7 | 1.7 | 1.8 | 1.8 | 1.8 | 1.7 |
| CaO | 8.4 | 8.4 | 8.5 | 8.5 | 8.5 | 8.3 |
| MgO | 4.2 | 4.2 | 4.3 | 4.3 | 4.3 | 4.3 |
| $Na_2O$ | 13.8 | 13.8 | 13.2 | 12.6 | 12.6 | 13.5 |
| $K_2O$ | 0.05 | 0.05 | 0.05 | 0.6 | 0.6 | 0.06 |
| $SO_3$ | 0.25 | 0.25 | 0.20 | 0.21 | 0.21 | 0.27 |
| $Fe_2O_3$ | 0.012 | 0.020 | 0.055 | 0.080 | 0.100 | 0.017 |
| $Nd_2O_3$ | 0.0015 | 0.0120 | 0.0280 | 0.0120 | 0.0600 | 0.0065 |
| CoO | 0 | 0 | 0 | 0 | 0 | 0 |
| $TiO_2$ | 0.02 | 0.02 | 0.03 | 0.03 | 0.03 | 0.01 |
| R | 0.20 | 0.21 | 0.25 | 0.25 | 0.26 | 0.21 |
| $T_v$ | 90.80 | 89.80 | 85.57 | 86.50 | 83.39 | 89.2 |
| x | 0.3095 | 0.3087 | 0.3054 | 0.3064 | 0.3031 | 0.3092 |
| y | 0.3169 | 0.3164 | 0.3162 | 0.3175 | 0.3144 | 0.3170 |
| $\lambda_d$ | 506.8 | 492.5 | 490.8 | 495.2 | 487.9 | 501.5 |
| $P_e$ | 0.18 | 0.49 | 1.75 | 1.28 | 2.76 | 0.31 |

TABLE 2

|  | Ex. 7 | Ex. 8 | Ex. 9 | Ex. 10 | Ex. 11 |
|---|---|---|---|---|---|
| $SiO_2$ | 71.6 | 71.6 | 72.9 | 72.1 | 72.1 |
| $Al_2O_3$ | 1.7 | 1.8 | 1.8 | 1.8 | 1.8 |
| CaO | 8.4 | 8.5 | 7.4 | 8.1 | 8.1 |
| MgO | 4.2 | 4.3 | 4.5 | 3.9 | 3.8 |
| $Na_2O$ | 13.8 | 12.6 | 13.2 | 13.0 | 13.1 |
| $K_2O$ | 0.05 | 0.6 | 0.06 | 0.91 | 0.60 |
| $SO_3$ | 0.25 | 0.21 | 0.17 | 0.20 | 0.18 |
| $Fe_2O_3$ | 0.012 | 0.370 | 0.012 | 0.071 | 0.370 |
| $Nd_2O_3$ | 0.0063 | 0.0212 | 0 | 0 | 0 |
| CoO | 0 | 0 | 0 | 0.0001 | 0.0020 |
| $TiO_2$ | 0.02 | 0.03 | 0.03 | 0.04 | 0.05 |
| R | 0.20 | 0.28 | 0.19 | 0.24 | 0.28 |
| $T_v$ | 90.50 | 62.36 | 90.86 | 86.72 | 59.86 |
| x | 0.3093 | 0.2891 | 0.3097 | 0.3070 | 0.2857 |
| y | 0.3167 | 0.3145 | 0.3172 | 0.3186 | 0.3133 |
| $\lambda_d$ | 497.8 | 490.0 | 524.0 | 500.8 | 489.5 |
| $P_e$ | 0.28 | 7.93 | 0.18 | 1.01 | 9.30 |

According to the present invention, the desired light blue flat glass can be obtained without controlling the content of a coloring component within an extremely small range of from 0.1 to 1 ppm. Namely, the $Nd_2O_3$ content is within a range of from 0.001 to 0.1% (from 10 to 1,000 ppm), which is a range sufficiently controllable in an industrial production, whereby industrial production of the desired light blue flat glass can easily be carried out.

The entire disclosure of Japanese Patent Application No. 2002-258889 filed on Sep. 4, 2002 including specification, claims and summary are incorporated herein by reference in its entirety.

What is claimed is:

1. A light blue flat glass which is soda-lime-silica glass and which contains Nd in such an amount that the content based on $Nd_2O_3$ represented by mass percentage, is from 0.001 to 0.02%, and no Co or Co in such an amount that the content based on CoO as represented by mass percentage, is less than 0.1 ppm, which contains no Fe or Fe in such an amount that the content based on $Fe_2O_3$ represented by mass percentage, is at most 0.02% and which contains at most 0.001 mass % $Er_2O_3$, wherein a dominant wavelength $\lambda_d$ of said flat glass is from 490 to 510 nm and wherein said flat glass has a visible light transmittance Tv of at least 85%, and an excitation purity Pe of at most 0.6%, as calculated at a thickness of 12 mm.

2. The light blue flat glass according to claim 1, which contains Fe, wherein $Fe^{2+}/(Fe^{2+}+Fe^{3+})$ is at most 0.4.

3. The light blue flat glass according to claim 1, wherein the soda-lime-silica glass comprises, as represented by mass percentage based on the following oxides, from 65 to 75% of $SiO_2$, from 0 to 5% of $Al_2O_3$, from 10 to 16% of $Na_2O$, from 0 to 5% of $K_2O$, from 5 to 15% of CaO and from 0 to 7% of MgO.

4. The light blue flat glass according to claim 1, which has a thickness of at least 5 mm.

* * * * *